Nov. 10, 1970     M. GRANÇON     3,538,785
ENERGY ABSORBING DEVICES
Filed April 18, 1968
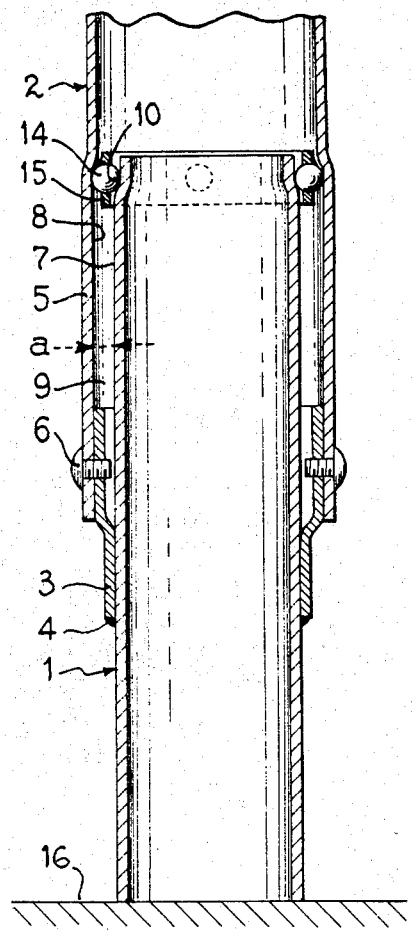
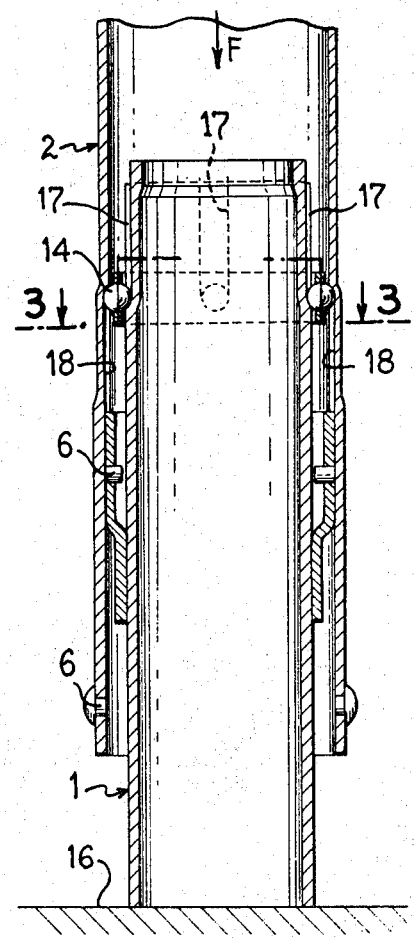
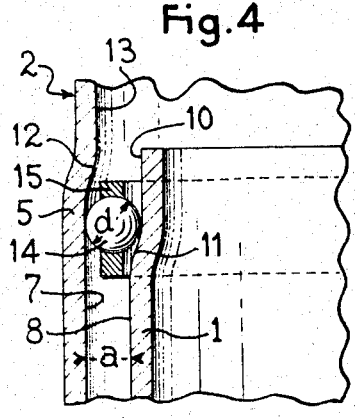
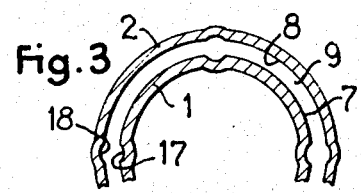
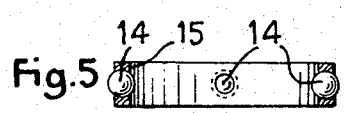
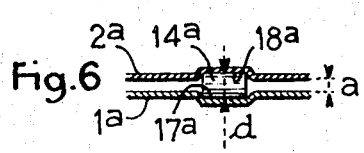

United States Patent Office

3,538,785
Patented Nov. 10, 1970

3,538,785
ENERGY ABSORBING DEVICES
Michel Grançon, Marnes-la-Coquette, France, assignor to Automobils Peugeot, Paris, France and Regie Nationale des Usines Renault, Billancourt, France, both French bodies corporate
Filed Apr. 16, 1968, Ser. No. 722,462
Claims priority, application France, June 12, 1967, 109,944
Int. Cl. B62d 1/18
U.S. Cl. 74—492                                3 Claims

ABSTRACT OF THE DISCLOSURE

Device for absorbing energy by creation of an opposing force which absorbs and dissipates said energy, said device comprising two tubular elements which are telescopically movable relative to each other and define therebetween an annular space, and rolling members disposed in said space, said rolling members having a diameter exceeding the radial width of said space and being capable of rolling in said space only by bringing about a permanent upsetting deformation of the walls of said tubular elements.

---

The present invention relates to a device which is of simple construction, easy to employ and capable of absorbing mechanical energy and more particularly kinetic energy by creation of an opposing force of roughly constant magnitude irrespective of the manner in which said energy is applied, ranging from a slow thrust to a shock, said energy being absorbed and dissipated without return of energy or subsequent rebound.

The device according to the invention comprises in combination two elements of a material which is plastically deformable when cold, said elements being movable relative to each other under the effect of energy to be absorbed and comprising parallel associated surfaces which define therebetween a space terminating in an enlarged entrance, and rolling members located in said entrance, said rolling members having a diameter exceeding the width of said space, whereby as they are obliged to roll on said faces in said space in the course of the relative movement of the elements they can only do so at the expense of a plastic upsetting of the material of which said elements are composed.

The invention therefore utilizes as energy absorbing means the plastic deformation of the metal or other material constituting said elements, this material having constant mechanical properties and the arrangement being such that there is an upsetting of the wall of said elements without a tearing of the material.

Another object of the invention is to provide applications of this device and in particular a safety steering column for a vehicle, this column comprising two tubular sections which are telescopically movable relative to each other and form therebetween a space in which rolling members having a diameter exceeding the width of said space can roll only at the expense of an upsetting, with permanent deformation, of the wall of said movable sections.

Further features and advantages of the invention will be apparent from the ensuing description with reference to the accompanying drawings.

In the drawings:

FIG. 1 is a partial longitudinal sectional view of a safety steering column for a vehicle comprising an energy absorbing device according to the invention, said figure showing this column in its normal longitudinal position of use with the device at rest;

FIG. 2 is a similar sectional view after operation of the energy absorbing device;

FIG. 3 is a partial sectional view taken along line 3—3 of FIG. 2;

FIG. 4 is a longitudinal sectional view on an enlarged scale of a portion of FIG. 1;

FIG. 5 is a diametral sectional view of the assembly of the balls and the retaining cage, and FIG. 6 is a partial sectional view of a modification having plane faces and rollers.

The invention will be described as apppplied to a steering column of an automobile vehicle.

This steering column is divided into two tubular coaxial sections 1 and 2 having different diameters and fitted one inside the other over a certain length. The centering of the two sections relative to each other is achieved at the lower part by a sleeve 3 rendered integral with the tube 1 by welding 4, brazing, riveting or other means.

The sections 1 and 2 are of steel or other alloy or material plastically deformable when cold by an upsetting.

The section 2 is engaged on this sleeve 3 by the lower end of an enlarged socket portion 5 and is held in position by a row of shear pins 6 of metal or plastics material adapted to shear upon application of a given axial thrust (Fo).

Formed between the inner face 8 of the socket 5 and the outer face 7 of the section 2 is a space 9 having a radial width $a$ which is constant in the presently-described embodiment. This space terminates in the upper part of the section 1 in an enlarged entrance due to a narrowed portion 10 of the upper end of the section 1. This entrance is defined by two radiused portions 11 and 12. The portion 11 connects the face 8 to the narrowed portion 10 and on the section 2, the portion 12 connects the inner face 7 of the socket 5 to the inner face 13 of the rest of the section 2 (see FIG. 4).

Located in the entrance thus defined are balls 14 of steel or other strong material. These balls are mounted with a slightly tight fit in this entrance and are evenly spaced apart on the periphery of the column and held in position for example by a cage 15 (FIG. 5) of plastics material in which they are mounted without clearance. This cage can be for example cast directly around the balls. The number and diameter of the balls are predetermined as a function of the desired opposing force.

The balls 14 have a diameter $d$ exceeding the width $a$ of the space between the cylindrical faces 7 and 8 and at rest during normal operation of the steering these balls, located in the entrance of this space, bear against the narrowed portion 10 of the tube 1 and against the inner face 7 of the socket 5 of the tube 2.

The assembly operates in the following manner:

One end of the column bears against a fixed face 16 of the vehicle (FIGS. 1 and 2) whereas the other end is subjected to the force F of the thrust or shock. So long as the force applied F does not reach the aforementioned value Fo which depends on the number, the type and diameter of the shear pins 6 and on the tight fit between the sleeve 3 and the tube 2 and the tight fit of the balls 14 in their initial housing (entrance of the space 7–8)—there is no relative movement between the tubes 1 and 2. But, when the force applied F exceeds this value Fo, the pins 6 shear and there is a relative longitudinal movement of the two tubes 1 and 2.

In the course of this movement, the balls 14 are constrained to roll from their initial housing having an initial slight tight fit towards the longitudinal annular space between the tubes 1 and 2 having a radial width $a$ which is distinctly less than the diameter $d$ of the balls (the difference $d-a$ being for example of the order of $d/6$). The rolling of the balls is manifested by a cold upsetting of the metal of the tubes in which the mark of the balls is left in the form of longitudinal grooves 17 and 18 (FIGS. 2 and 3) thus producing the opposing force which is required and whose value remains roughly constant throughout the travel, irrespective of the relative speed of displacement of the tubes 1 and 2.

The chamfers or radii 11 and 12 (FIG. 4) between the parts of different diameters of the tubes 1 and 2 result at the start of the travel in a progressive variation in the opposing force from the initial value Fo to a maximum value.

It will be noted that the absorption of energy is achieved without an increase in the diameter of the steering column (apart from the small increase along each groove 18) and consequently without danger of deterioration of elements adjacent this column.

It will be understood that the invention is applicable each time it is necessary to absorb energy without returning this energy. In its most general form, the device can comprise two elements having parallel faces, these faces being plane or cylindrical and defining a space in which roll balls or rollers having a diameter exceeding the width of this space so that their rolling occurs at the expense of an upsetting of the material of these tubular elements.

The space in which the rolling members are constrained to roll can have a constant or variable width, for example a decreasing width, to afford a progressive absorption of energy.

FIG. 6 shows an arrangement having plane walls 1ª, 2ª which define therebetween a space in which, in the course of the relative displacements of these elements in a direction perpendicular to the plane of the figure, must roll rollers or needles 14ª having a diameter $d$ exceeding the space $a$ between these elements. These elements thus upset the walls at 17ª and 18ª and absorb energy.

Having now described my invention what I claim as new and desire to secure by Letters Patent is:

1. A device for absorbing energy by creation of an opposing force which absorbs and dissipates said energy with no return of energy or subsequent rebound, said device comprising in combination two coaxial cylindrical elements of a material which is plastically deformable when cold, breakable means interconnecting said elements which are adapted to break when a predetermined load acts on said elements, said elements being movable relative to each other under the affect of energy to be absorbed and comprising parallel associated surfaces which define therebetween an annular space terminating in an enlarged annular entrance, rolling members located in said entrance, said rolling members having a diameter exceeding substantially the width of said annular space, whereby as the rolling members are obliged to roll on said surfaces in said space in the course of the relative movement of the elements they can only do so at the expense of a plastic upsetting of the material of which said elements are composed, and a cage member located between said elements and around the rolling members, for maintaining said rolling members in spaced circumferential relationship during the relative movement of said elements, said cage member having a radial thickness substantially less than the diameter of the rolling members.

2. Steering column for an automobile vehicle, said column comprising two tubular elements which are telescopically movable relative to each other and define therebetween an annular space terminating at one end in an enlarged entrance, breakable means interconnecting said elements which are adapted to break when a predetermined load acts on said elements, rolling members disposed in said entrance, said rolling members having a diameter exceeding substantially the radial width of said annular space and being capable of rolling in said space only by bringing about a permanent upsetting deformation of the walls of said tubular elements, and a cage member located between said elements and around the rolling members, for maintaining said rolling members in spaced relationship during the relative movement of said elements, said cage member being of plastics material cast around said rolling members.

3. An energy absorbing device comprising two telescopic inner and outer elements defining therebetween an annular space and being movable relative to each other under the effect of an axial load, at least one of said elements being plastically deformable when cold, said outer element having an outwardly flared portion at its end adjacent to the inner element, said inner element having a constricted portion at its end adjacent to said outer element, whereby said portions define therebetween an enlarged annular space, breakable means interconnecting the outer and the inner elements, which are adapted to break when said load exceeds a predetermined value, rolling members mounted with a slightly tightfit in said enlarged annular space and having a diameter substantially greater than the width of said annular space, whereby as the rolling members are caused to roll in said space during the relative movement of the telescopic element, they induce a plastic upsetting of at least one of said elements, a retainer cage member being provided in said enlarged space, around said rolling members, for maintaining said rolling members in spaced circumferential relationship during the relative movement of the elements, said retainer cage member having a radial thickness which is substantially less than the diameter of the rolling members.

References Cited

UNITED STATES PATENTS

| | | | |
|---|---|---|---|
| 2,422,774 | 6/1947 | Conner | 308—4 |
| 2,774,430 | 12/1956 | Blazek. | |
| 3,392,599 | 7/1968 | White | 74—492 |

MILTON KAUFMAN, Primary Examiner

U.S. Cl. X.R.

188—1